Nov. 11, 1958 P. GROSSMANN 2,859,528
DEVICES FOR MEASURING THE HORIZONTAL
COORDINATES OF A RAILWAY TRACK
Filed March 8, 1954 2 Sheets-Sheet 1
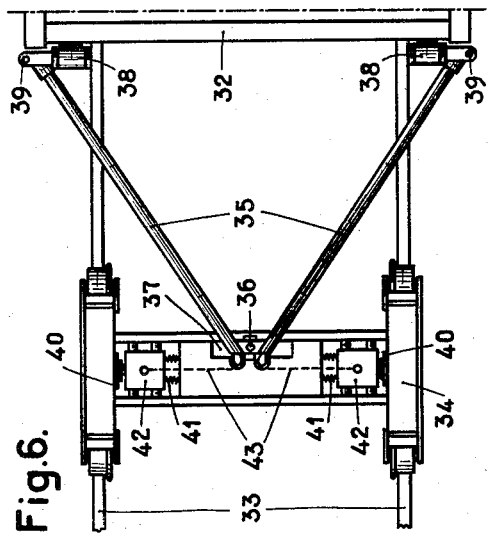
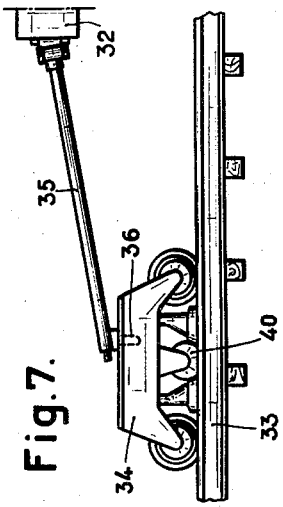
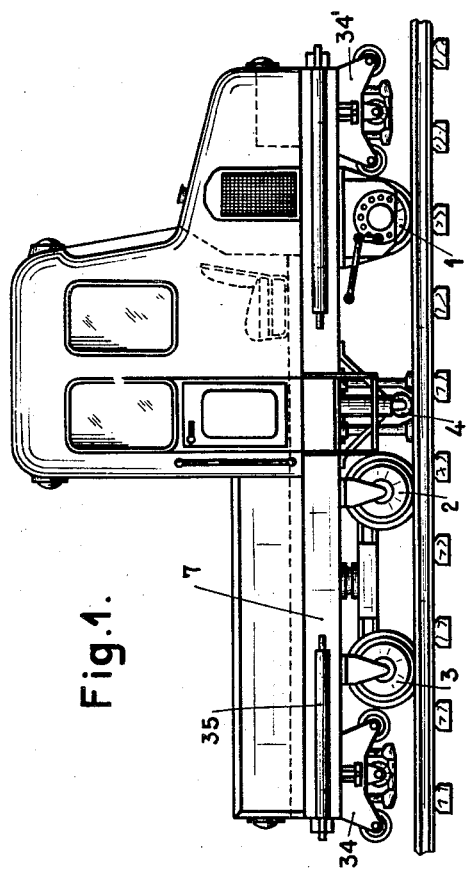
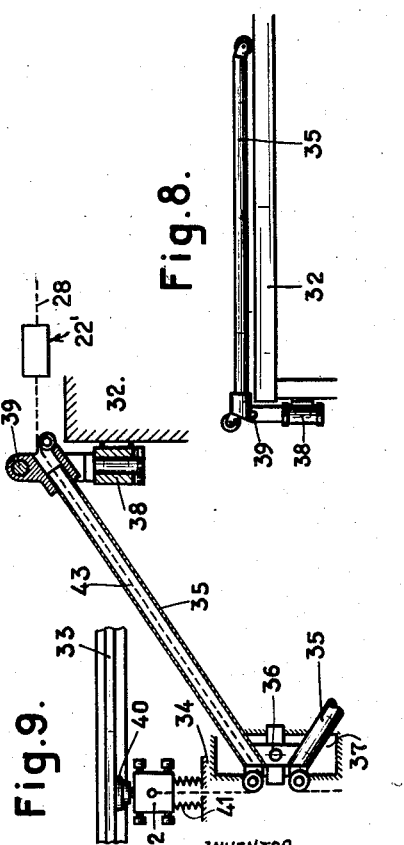
INVENTOR
Paul Grossmann
Kane, Dalsimer and Kane
ATTORNEYS

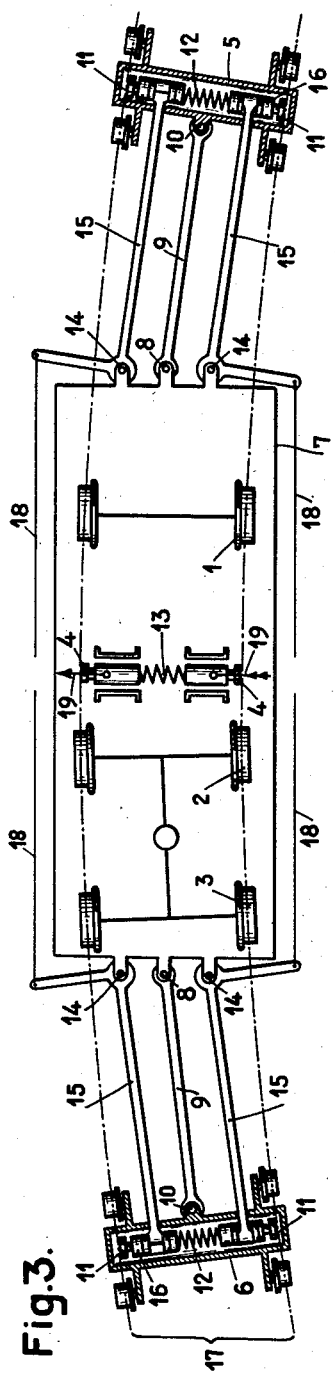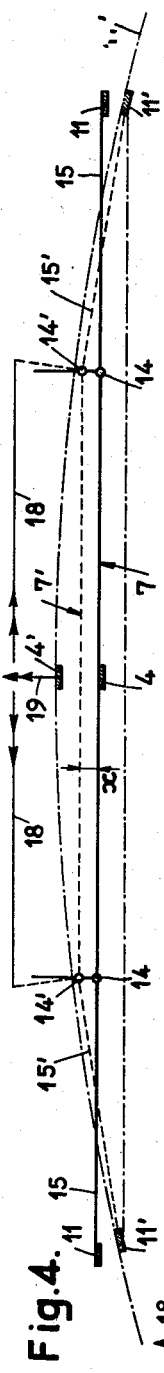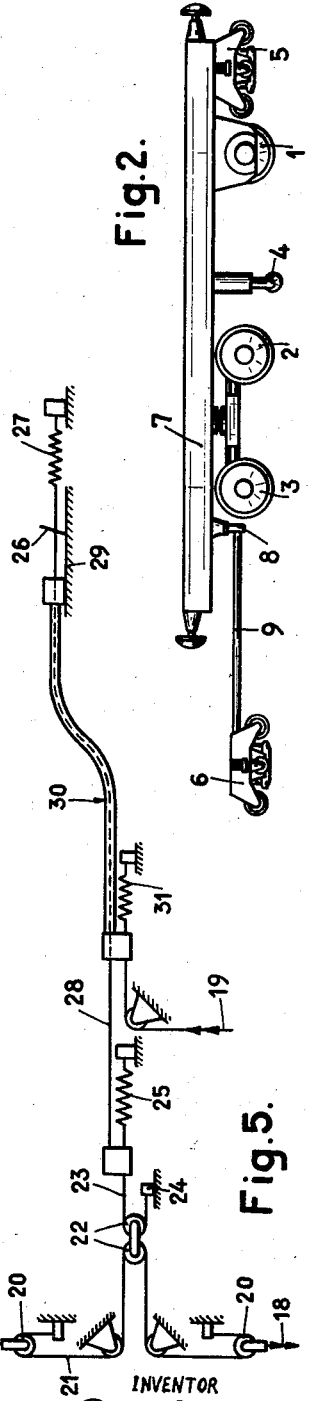

United States Patent Office 2,859,528
Patented Nov. 11, 1958

2,859,528

DEVICES FOR MEASURING THE HORIZONTAL COORDINATES OF A RAILWAY TRACK

Paul Grossmann, Renens, Switzerland, assignor to Materiel Industriel S. A., Grand Pont, Lausanne, Switzerland, and Constructions Mecaniques S. A., Renens, Switzerland, both corporations of Switzerland Application March 8, 1954, Serial No. 414,830

Claims priority, application Switzerland March 12, 1953

6 Claims. (Cl. 33—144)

This invention relates to the detection of irregularities in the alignment of railroad tracks and more particularly to measuring the horizontal coordinates of a railway track for the purpose of detecting and recording the camber of the longitudinal alignment of the rails of a railway track.

It is an object of this invention to provide a method and means for measuring and recording the horizontal irregularities of the longitudinal dimension of a railway track.

It is another object of this invention to provide a device which has measuring and recording means for detecting and recording the horizontal irregularities of a railway track.

It is another object of this invention to provide a device which will move along a railway track on wheels and, by means of attachments, measure and record the horizontal coordinates of points arranged longitudinally along the railway track.

It is still another object of this invention to provide a measuring and recording means for a camber measuring device which measures the camber of the track by means of one or more wheeled attachments coupled to a main vehicle which carries recording means.

A still further object of this invention is to provide a measuring and recording means for a track measuring device which measures the camber of the track by means of one or more wheeled attachments coupled to a main vehicle which carries recording means.

A still further object of this invention is to provide a device for measuring the horizontal camber of railway track rails including a vehicle having a recording mechanism which is attached to measuring means and produces a record of the true contour of the camber upon the passage of the vehicle along the railway track.

These and other objects of this invention will become more apparent upon consideration of the following description taken together with the accompanying drawings in which:

Fig. 1 is a side elevation of a vehicle equipped according to this invention to take measurements of the rail camber of railway track rails;

Fig. 2 is a semi-schematic side elevation of the chassis of the vehicle of Fig. 1 according to this invention, with one of the attached cars extending in working position and the other of the attached cars withdrawn into non-operative position;

Fig. 3 is a semi-schematic plan view of the wheels and the measuring equipment of the vehicle of Fig. 1;

Fig. 4 is a diagram illustrating the measurements of the camber of the railway track independent of the displacements of the chassis of the vehicle of Fig. 1;

Fig. 5 is a diagrammatic illustration of the cable and recording mechanism according to this invention;

Fig. 6 is a top plan view of one end of the vehicle and of the attached car in its measuring position and shows a modified form of construction;

Fig. 7 is a side elevation of the vehicle end and car shown in Fig. 6;

Fig. 8 is an elevational view of means for attaching the cars to the chassis of the vehicle in the non-operative position; and Fig. 9 is a schematic plan view of the recording cable mechanism attachment of the car shown in Figs. 6 and 7.

This invention relates generally to a device for measuring the cambers of railway tracks and provides a vehicle or main car to which two cars or auxiliary cars are attached. The vehicle carries also the recording mechanism which is attached to the measuring mechanism of the vehicle and the attached cars. As the vehicle itself rolls along the railway track that is to be inspected, it is necessary that the measurements of the camber be taken independently of the displacements of the chassis of this vehicle. In this way the measurements are the same as they would be if they had been made from a stationary base. The cars which are attached to the vehicle may be folded up in a non-operative position when not taking measurements. When in the operative position, the cars are attached to the vehicle with movable coupling means which serve to hold one of the cars at a distance in front of the vehicle and the other car at a distance behind the vehicle and permits both of the cars to follow the track independently of the vehicle and to become displaced while doing so. This displacement is relative to a fixed point of attachment which is integral with the vehicle. The vehicle, like each car, carries pressure sensitive contacts applied laterally elastically against the head of the rails. The lateral displacements of these contacts are transmitted to recording elements arranged in such a way as to supply, as an indication of the camber of each rail, the distance from each contact of the vehicle to the chord defined by the two contacts of the cars situated on the same side.

A vehicle in accordance with the first form of this invention, shown in Fig. 1, is of the automobile type. It is a carriage travelling on three pairs of wheels carried on axles 1, 2 and 3. The axles 2 and 3 constitute a separate truck in the present case.

Near its center the vehicle carries lateral pressure sensitive contacts in the form of rollers 4, pressed elastically against the rail head. The vehicle of Fig. 1 has attached to it two cars, 5 and 6, with one under each projecting end of a chassis 7. The cars 5 and 6 are attached by two similar coupling bars provided with articulations at their two ends, four similar L-shaped levers, and the equipment for the installation of these various auxiliary elements.

It is thus possible to equip the vehicle of Fig. 1 with two pendulums, one in the vicinity of each of its ends, one pendulum being composed of the car 5 which precedes the vehicle and the other of the car 6 which follows it, to which cars 5 and 6 the vehicle will be attached in each case by one of the two coupling bars provided with articulations.

Fig. 2 illustrates the attachment of the car 6, showing how the car 6 is able to constitute a pendulum by setting it down upon the track and connecting it through an articulation 8 to a fixed point of attachment on the chassis of the vehicle, a coupling bar 9 connecting the car 6 to the articulation 8. The car 5 is similarly connected and the semi-schematic plan view of Fig. 3 shows the resulting arrangement. For the purpose of this description the coupling bars, articulations and other elements belonging to each car are designated by the same reference characters as they are identical. Thus the points of articulation of the coupling bars 9 at the cars 5 and 6 respectively are designated by 10. These points of articulation are normally situated on the longitudinal axis, in the direction of travel, of the vehicle and the cars, so that the two pendulums obtained in this way are not only identical with one another but constitute a perfectly symmetrical arrangement.

The details for assembling and taking apart these elements and the elements which will appear in the following description are not given here. These details are measures which a person skilled in the art can carry out in such a way as to make these operations easy and possible to carry out properly.

Each of the cars 5 and 6 travels on four wheels that are not designated by reference characters and it carries, between these wheels, lateral pressure sensitive contacts in the form of rollers 11 which springs 12 press elastically against the rail head.

The plan view of Fig. 3 shows that the pressure sensitive rollers 4 of the vehicle of Fig. 1, herein referred to as the central rollers 4 relatively to the end rollers 11 of the cars 5 and 6, are disposed midway between the pairs of these rollers 11 laterally against the rail head.

On either side of the articulations 8 of the bars 9 coupling the cars 5 and 6 to the chassis 7, and at an equal distance from these articulations, are situated the articulations 14, upon which are pivoted the angle points of the four L-shaped levers mentioned above and designated by 15.

The ratios of the displacements made by the ends of the arms of these levers in transmitting motion through the levers will be equal for all the levers and given by the construction. In the description which follows it will be assumed that this ratio is one to four, although the dimensions adapted for Fig. 3 show a different ratio.

Each end of the long arm of these levers is engaged in a groove of a corresponding part 16 through which the springs 12 push the pressure sensitive rollers 11 against the rail heads. These parts 16, moreover, support the said rollers 11 and consequently participate in all their lateral displacements which the ends of the levers 15 will faithfully follow. The ends of the small arms of the levers 15 will reproduce all these displacements in the adopted ratio of one to four, corresponding to what is shown in Fig. 4, referred to in detail below.

The described assembly is shown on a curve of a track 17 in Fig. 3. It is shown how the two pendulums 9—5 and 9—6 pivot as a function of the camber of this curve and how the levers 15 consequently become displaced. Transmission cables 18 connect the ends of the small arms of the elbow levers 15 to measuring apparatuses and similarly cables 19 connect to these apparatuses the central pressure sensitive rollers 4 and transmit their lateral displacements.

Fig. 4 relates to measuring the camber of a single row of rails 17'. The pressure sensitive rollers 11, 4, 11 on the side under consideration, which are normally in alignment when the line of rails is straight, occupy the positions 11', 4', 11', corresponding to the curve that is illustrated. The L-shaped levers move in a similar way from the position 15 to the position 15'. Finally, the corresponding cables 18 and 19 undergo a displacement, the direction of which is indicated by arrows, transmitting, in the reduced proportion of four to one, the distances between 11 and 11' as respects the cables 18, and in full size as respects the distance 4 to 4', assuming that the vehicle chassis has remained in its original alignment and has consequently not been subjected to the influence of the curve, that is to say, as if the articulations 14 had not been displaced to 14'.

Relatively to the reference line 11—4—11, we see that the camber that is to be measured is equal to the sum of the distance from 4 to 4' and of one distance from 11 to 11', assuming symmetry of parts and the corresponding chord is the distance between the pressure sensitive rollers 11 of the cars 5 and 6 situated on the same side of the track.

Assuming:

Distance 4 to 4'=$a$
Distance 11 to 11'=$b$ we then have the camber:

$$f = a + b$$

and, disregarding the sign, a displacement of the value $a$ for the cable 19, and of the value 0.25 $b$ for the cable 18, still assuming that the articulations 14 have not been displaced laterally. The effect of displacement is considered below.

Referring first to the recording device of Fig. 5, the attachment of the ends of the cables 18 and cable 19 is shown with the arrows indicating the directions of their displacement.

The cables 18 act on two pulleys 20 mounted block-and-tackle fashion on a length of a cable 21 which runs in its turn round a guide pulley for a pair of pulleys 22.

If the travel of the two cables 18 is 0.25 $b$, then each length of cable 21 acting on either side of the pulley 22 will travel a distance equal to 0.5 $b$, in which travel the pulley 22 will participate. The other pulley 22 of this pair, acting once more in block-and-tackle fashion on the length of cable 23, fastened at 24, is pulled back by a spring 25 and is connected to a recording pen, pencil or stylus 26 and a spring 27 by a third length of cable 28. It is also seen that this cable 28 will be carried the entire amount $b$ toward the left relatively as shown in Fig. 5.

A table 29, upon which a strip of paper unwinds below the stylus 26 perpendicular to the plane of the drawing, serves as a fixed point at one end of a casing 30 for the cable 28, the other end of this casing being displaced by the cable 19 and pulled back by the spring 31.

The displacement of the amount $a$ of the cable 19 is entirely transmitted to the end of the casing 30 and it is in a direction contrary to the preceding displacement by the spring 31. Thus the inscription made by the stylus on the strip of paper will be equal to the sum of the displacements of the length of cable 28 and of the casing 30, that is to say:

$$a + b = f$$

which is the sought for measurement of the camber.

In reality the measurement is made with the vehicle chassis displaced from 7 to 7'; that is, displaced laterally by a value $x$ as shown in Fig. 4 and the articulations 14 are displaced by the same amount to 14'. The relative travel recorded by the central pressure sensitive roller 4 will in this case be $a-x$ while that of the cable 28, with respect to the rollers 11, will be equal to $b+x$. As a result, the recording will be:

$$(a-x) + (b+x) = a + b = f$$

The result being consequently independent of the magnitude of $x$, we see that the vehicle chassis can make any lateral displacement whatever without in the least affecting the value of the cambers that are recorded.

It can even make any rotary movement in its plane, because the decrease in the amount recorded for one of the levers 15 will be directly compensated by the increase of the amount recorded by the opposite lever 15.

A study of Fig. 3 shows that the lengths of the long arms of the levers 15 vary slightly with the attitude of the cars. But, taking into consideration the large radii of curvature to which the measurements apply, these differences are practically without influence upon the final recordings.

The main advantage obtained by the arrangement in accordance with the invention is to make it possible, by the aid of the two movable pendulums, to convert a vehicle of small dimensions into a vehicle capable of making camber measurements using a relatively long chord.

The modified form of construction, illustrated in Figs. 6 to 9, sets forth another way of proceeding so as to arrive at the same result. A vehicle or main car of reduced dimensions similar to that of Fig. 1 transports two cars or auxiliary cars, similar to cars 5 and 6, and provided with sensing rollers 4. The device of Figs. 6 through 9 differs in the method of coupling and of bringing the cars into operative position.

The plan view of Fig. 6 and the corresponding elevation of Fig. 7 show one end of a chassis 32 of the modified device rolling along a track 33 and pulling a car 34. Car 34' which is identical to car 34 is pushed by the main car. Car 34' is not shown in Fig. 6, but is shown in Fig. 1.

The connection between the vehicle and the car 34 in this modification is made through the intermediary of two tubes 35 which form, with the chassis 32, a triangle whose outer apex is attached to a vertical axle 36. This latter forms the fixed point of attachment integral with the vehicle, relatively to which a slide 37 of the car ensures this car, as in the case of the pendulum of the first form of construction described above, with entire freedom of movement, permits it to follow the track, and permits it in particular always to become displaced radially in curves.

Articulations 38 on the chassis 32 permit the tubes 35, and consequently permit the pivot constituted by the axle 36, to move upward or downward as a function of the relative vertical displacements of the car.

A supplementary articulation 39 of the points of attachment of the tubes 35 to the vehicle chassis, as shown in Figs. 6 and 9, permits these tubes 35 to be folded back laterally against the main members of the said chassis 32 when the car 34 is not being utilized and is fastened under the chassis 32 for the purpose of transportation. Fig. 8 shows the position of the tubes 35 when thus folded back. In order to fold these tubes backwardly it is necessary that they be detached from axle 36.

The car 34 carries two pressure sensitive rollers 40 which springs 41, acting on sliding supports 42, push laterally against the head of the rails of each line of the rails along which the car 34 runs. The displacements of these rollers 40 are transmitted to measuring apparatuses and recording apparatuses through the intermediary of cables or chains 43 running through the interior of tubes 35 which thus serve to protect them, as shown in Fig. 9.

In the modification of Figs. 6 through 9, in the absence of transmission levers, the displacements of the rollers are transmitted full scale. To connect the measuring equipment with the recording equipment therefore suffices to connect together the cables or chains coming from the two pressure sensitive rollers situated on the same side of the contrivance which has just been described and to run them directly to the recording equipment shown in Fig. 5. One manner of accomplishing this is to connect cable 43 to cable 28 through a pulley means indicated generally by the numeral 22' in Fig. 9 which reverses the direction of the effective motion of cables 43. Thus connection is made to the stylus 26. The connection to the corresponding central pressure sensitive roller of the vehicle remains the same in the modification as in the first described form. The measurements taken by the modification of Figs. 6 through 9 are independent of the inherent movements of the vehicle chassis 32 by the adjustments of the recording assembly. Various advantages of the devices of this invention include the provision of the two pendulums which convert the relatively small vehicle into a vehicle which is capable of making camber measurements with a relatively long chord.

Various other modifications of the device of this invention may be made without departing from the spirit thereof. For example, the cables may be entirely or in part replaced by chains. The vehicles of the above described devices may be light in weight, therefore a platform 44 may be provided, as indicated in Fig. 1, to receive any desired load for the simulation of normal loading conditions when measuring and recording a railway track. In addition, the vehicle of this invention may be moved by any suitable motive power and is not limited to automobile power. Accordingly, it is intended that the scope of this invention be limited only by the appended claims.

I claim:

1. A measuring and recording device for determining the horizontal camber of a rail of a track comprising in combination a main rail car, a rail contacting member mounted on said main car, means yieldingly urging said rail contacting member horizontally against said rail; an auxiliary rail car pivotally connected to said main car and disposed adjacent one end thereof, a second rail contacting member mounted on said auxiliary car, second means yieldingly urging said second rail contacting member horizontally against said rail; a second auxiliary rail car pivotally connected to said main car and disposed adjacent the other end thereof, a third rail contacting member mounted on said second auxiliary car, third means yieldingly urging said third rail contacting member horizontally against said rail; and means for measuring and recording the relative horizontal displacements of said first, second and third rail contacting members.

2. A measuring and recording device for determining the horizontal camber of a rail of a track comprising in combination a main rail car, a rail contacting member mounted on said main car, means yieldingly urging said rail contacting member horizontally against said rail; an auxiliary rail car, coupling elements attaching said auxiliary car to an end of said main car, said coupling elements being pivotally connected at one end for vertical movement with respect to said main car, a groove formed in said auxiliary car transverse to the direction of the motion of the auxiliary car along the track, a second rail contacting member slidably mounted in said groove, means yieldingly urging said second rail contacting member against said rail; a second auxiliary rail car, second coupling elements attaching said second auxiliary rail car to the other end of said main car, said second coupling elements being pivotally connected at one end for vertical movement with respect to said main car, a second groove formed in said second auxiliary car transverse to the direction of the motion of the second auxiliary car along the track, a third rail contacting member slidably mounted in said groove, means yieldingly urging said third rail contacting member against said rail; and means for measuring and recording the relative horizontal displacements of said first, second and third rail contacting members.

3. The measuring and recording device for determining the horizontal camber of a rail of a track defined in claim 2 in which the coupling elements attaching the first auxiliary car to the main car consist of two members which form with the end of the main car a triangle and an apex of said triangle pivotally connected to said first auxiliary car.

4. A device as claimed in claim 3 in which said coupling elements are pivotally articulated for horizontal movement in the vicinity of the angle of the sides of the main car whereby each of these elements may be folded back along a side of the main car when it is not used to pull or push a car.

5. A device as claimed in claim 3 in which each of said coupling elements has an axial hole through which there passes a connection between the rail contacting member in the respective auxiliary car and said measuring and recording means in the main car.

6. A device as claimed in claim 3 in which each of said coupling elements has an axial hole through which there passes a cable connection between the rail contacting member in the respective auxiliary car and said measuring and recording means in the main car.

References Cited in the file of this patent

UNITED STATES PATENTS

| | | |
|---|---|---|
| 367,708 | Dudley | Aug. 2, 1887 |
| 1,611,185 | Gunn | Dec. 21, 1926 |
| 2,042,614 | Mauzin | June 2, 1936 |
| 2,144,946 | Trapnell | Jan. 24, 1939 |
| 2,814,119 | Grossmann | Nov. 26, 1957 |

FOREIGN PATENTS

| | | |
|---|---|---|
| 657,880 | France | Jan. 21, 1929 |